Dec. 29, 1931. S. S. FURRER 1,838,176
POWER LIFT HARROW
Filed July 22, 1929 3 Sheets-Sheet 1

INVENTOR:
Samuel S. Furrer,
By
ATTORNEY.

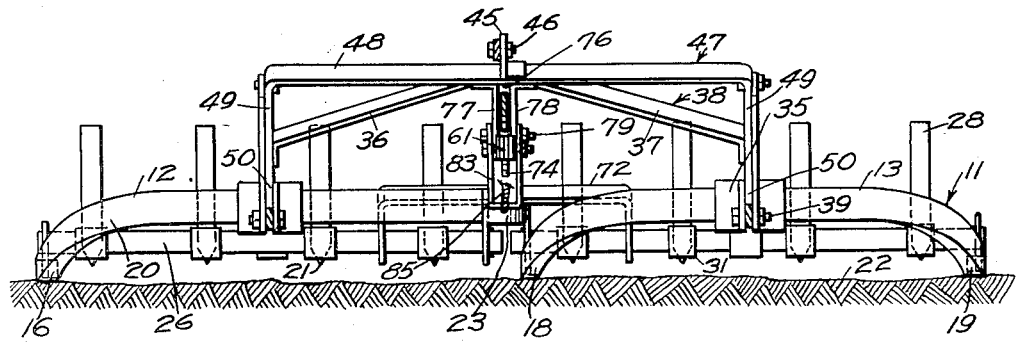
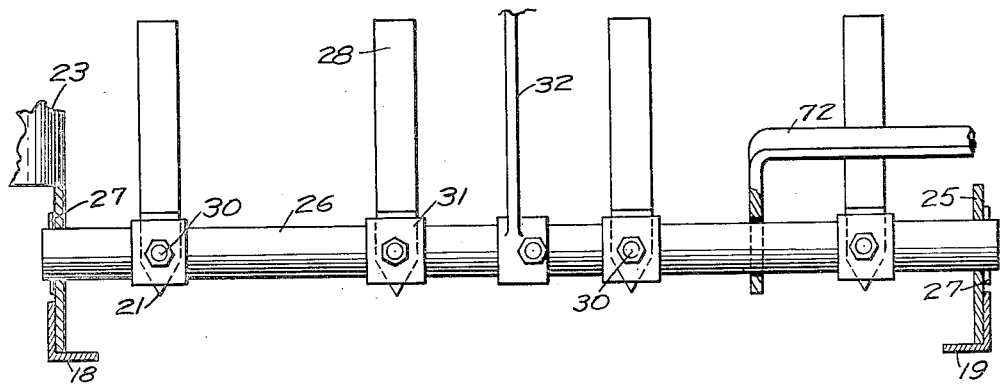

Dec. 29, 1931.  S. S. FURRER  1,838,176
POWER LIFT HARROW
Filed July 22, 1929  3 Sheets-Sheet 3
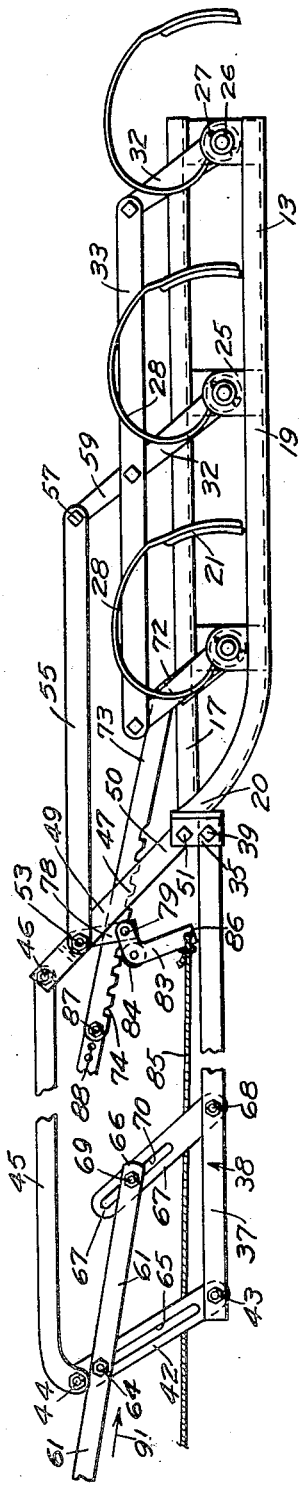
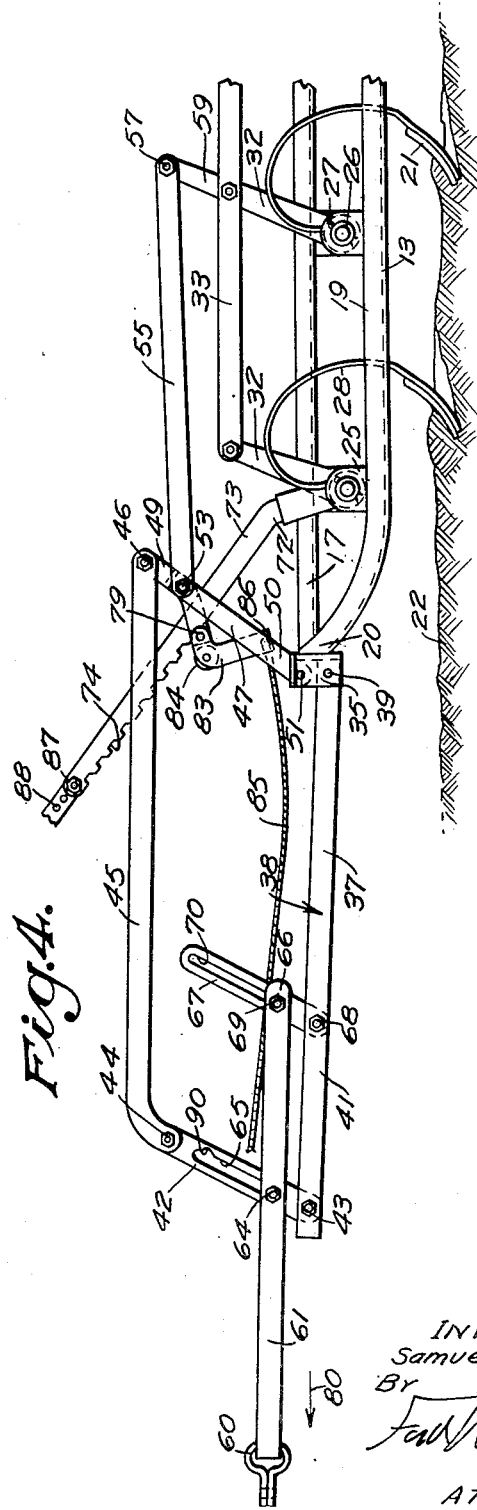
INVENTOR:
Samuel S. Furrer,
By
ATTORNEY.

Patented Dec. 29, 1931

1,838,176

UNITED STATES PATENT OFFICE

SAMUEL S. FURRER, OF OXNARD, CALIFORNIA, ASSIGNOR TO BRENNEIS MANUFACTURING COMPANY, OF OXNARD, CALIFORNIA, A CORPORATION OF CALIFORNIA

POWER LIFT HARROW

Application filed July 22, 1929. Serial No. 380,001.

This invention relates to ground working implements and relates particularly to a mechanism whereby the operating elements, such as harrow teeth, may be moved between a variety of positions without the necessity of the driver of a tractive vehicle leaving the seat thereof.

Although the invention has application in many types of ground working vehicles and implements, it is of especial advantage in the construction of harrows which are employed to prepare plowed soil, and in various other manners. The present construction of harrows familiar to the inventor includes a frame structure and harrow teeth, which may be either of the rigid or spring type, and a lever having a segmental latch to enable the setting of the harrow teeth at a desired slope or at a desired position of ground penetration or engagement.

The old type of harrows proved entirely satisfactory in the days when farm animals were employed to pull the various farm implements, as in such practice of using farm animals the farm hand walked behind the harrow or rode thereon so that he was at all times in a position convenient for the operation of the control levers.

At the present time power driven tractors have replaced farm animals to a large extent in the progressive farm communities, these tractors having a seat thereon for a driver.

In order to adjust a harrow device for a desired position of ground engagement or penetration, it is necessary for the driver to stop the tractor and dismount. The necessity for changing the position of the harrow blades sometimes arises quite often, especially where the harrow is being used on what is termed "trashy ground", or ground containing weeds or sticks which accumulate in front of the teeth of the harrow, making it necessary to swing these teeth backward or upward into such position that the accumulation of trash will be released.

It is an object of this invention to provide a draft or pulling device for a farm implement, such as a harrow, so constructed that by forward and rearward movements of the tractor the operating devices of the farm implement, such as harrow teeth may be moved from and between the various positions which are required in the use of the farm implement.

A further object of the invention is to provide in such implements as hereinbefore described a simple and effective means, operative from the seat of the tractive vehicle to cause the swinging of the operating elements from a position of operation to a position of inoperation.

A further object of the invention is to provide a simple form of apparatus which will operate, in consequence of rearward pressure applied thereto by the backing up of the tractive vehicle, to move the operating elements toward operative or ground engaging position, and to further provide a releasable latch mechanism by which the extent of ground penetration may be controlled to suit the desires of the operator.

A further object of the invention is to provide a frame structure for a farm implement including U-shaped frame members so formed and so assembled that a minimum width of slide surface will be presented to the ground over which the implement is drawn.

Further objects and advantages will appear throughout the following part of the specification.

Referring to the drawings which are for illustrative purposes only,

Fig. 2 is a front elevational view corresponding to Fig. 1, but with the pole bar structure in section on a plane substantially as indicated by the line 2—2 of Fig. 1.

Fig. 3 is an elevation looking toward the right side of the harrow shown in Fig. 1, the operating elements of the harrow being shown in positions which they respectively assume when the harrow teeth are in raised or inoperative position.

Fig. 4 is a side elevation showing the forward portion of the harrow with the power lift mechanism in position corresponding to operative or ground penetrating positions of the harrow teeth.

Fig. 5 is an enlarged fragmentary section taken substantially as indicated by the line 5—5 of Fig. 1.

Figure 1:
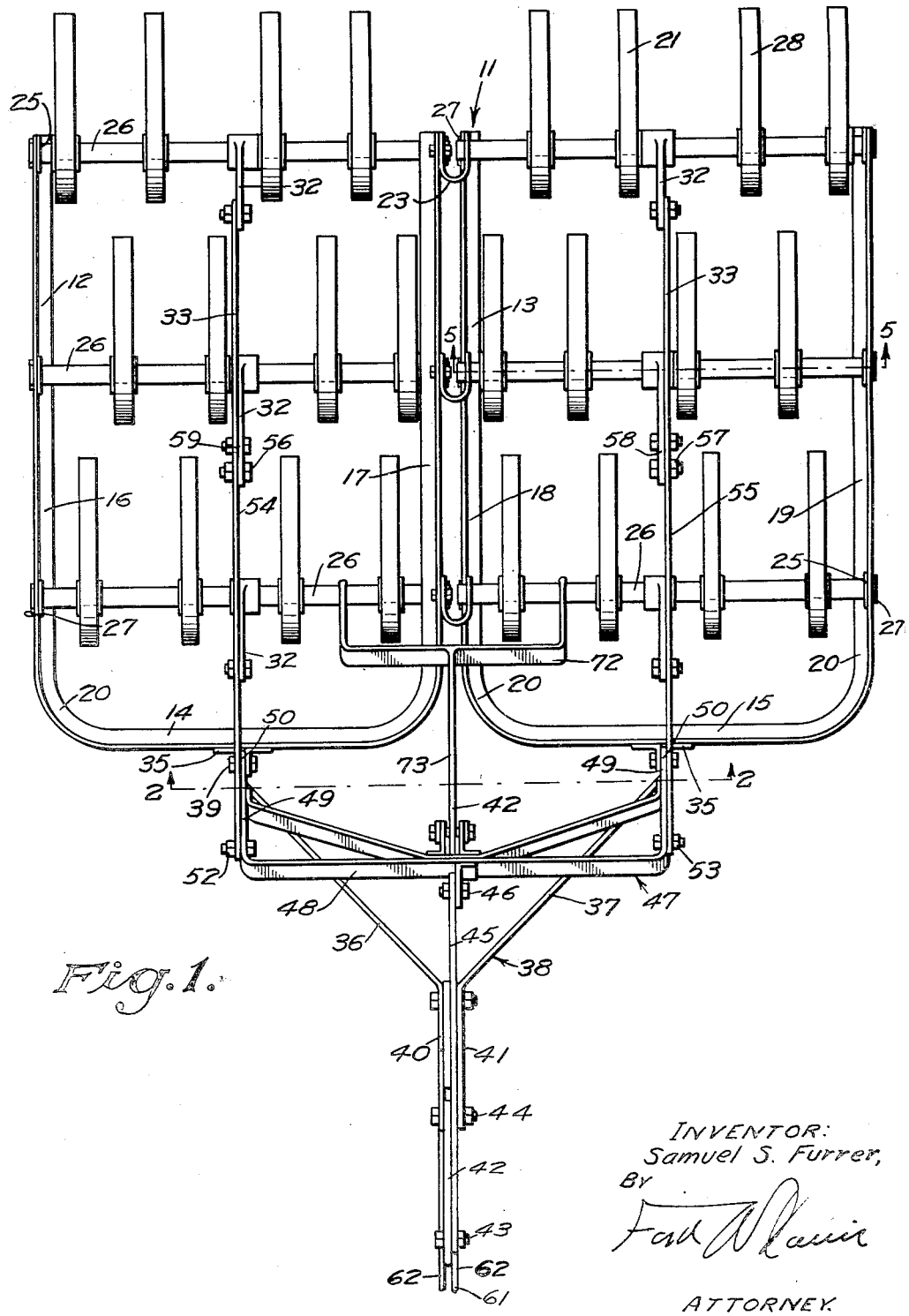
Fig. 1 is a plan view of a harrow embodying the invention.

In the construction of a harrow embodying the principles of the invention I have shown a frame structure 11 consisting of a plurality of U-shaped frame members which may be respectively designated as 12 and 13. The frame members 12 and 13 respectively consist of structural angles bent respectively to provide front extensions 14 and 15 and rearwardly extending sides or legs 16, 17, 18, and 19, forward end portions 20 of the legs 16, 18, and 19 being bent upwardly, as best shown in Fig. 3, so that the front extensions 14 and 15 of the U-shaped frames 12 and 13 will be somewhat above the plane or surface on which the harrow frame 11 slides when operating devices or harrow teeth 21 are in retracted position, as indicated in Figs. 2 and 3. The leg 17 of the U-shaped member 12 extends rearwardly on substantially the same plane as the front extension 14 so that it will not be in a position of sliding engagement with the ground 22. From Fig. 2 it will be perceived that only the legs 16, 18, and 19 rest on the ground surface 22. The leg 17 of the U-shaped member 12 is secured by metal brackets 23, Figs. 1 and 5, to the leg 18 of the U-shaped member 13, so that the weight of the intermediate section of the harrow is carried entirely by a single longitudinal slide member formed by the leg 18 of the U-shaped frame member 13.

By means of suitable plates or brackets 25 spaced in lateral alignment along the legs 16, 17, 18, and 19, shaft members consisting of sections of pipe 26 are rotatably secured, there being retaining means 27, such as pins, for preventing lateral displacement of the shaft members 26.

In the form of apparatus with which the invention is described the harrow teeth 21 include curved spring elements 28 and are secured to the rotatable shafts 26 by means of bolts 30, as shown in Fig. 5, extended through fixtures 31 formed at the inner ends of the spring members 28. Also secured to the shafts 26 in upwardly extending position are throw levers 32 which are connected together so as to swing in unison by links 33.

From angle clip brackets 35 secured substantially in the center of each front extension 14 and 15, legs 36 and 37 of a pull bar 38 forwardly extend. The pull bar 38 hinges, so as to swing vertically, on bolts 39 which are carried by the brackets 35. The legs 36 and 37 of the pull bar 38 converge as they extend forwardly and are provided with parallel end sections 40 and 41. A primary lever 42 is pivoted on a bolt 43 extended through the forward ends of the sections 40 and 41 of the pull bar structure 38 and is adapted to swing in a vertical plane above the pull bar 38.

From a hinge means in the form of a bolt 44 at the upper end of the primary lever 42 a primary link 45 extends to pivotal connection at 46 with the upper end of an intermediate lever 47 which consists of a frame 48, as shown in Fig. 1, having downwardly extending legs 49, the lower ends 50 of which are pivoted at 51 to the upper portions of the brackets 35. From bolts 52 and 53 at the upper ends of the legs 49 secondary links 54 and 55 extend to bolts 56 and 57 providing pivot means at the upper ends of extensions 58 and 59 provided on the selected levers 32.

It will be noted from Fig. 1 that from the three shafts 26 of the U-shaped frame member 12 three throw levers 32 upwardly extend, and that from the three shafts 26 of the U-shaped frame member 13 three throw levers 32 upwardly extend. One lever of each group consisting of three levers 32 is provided with an upward extension 58 or 59 respectively, the central lever 32 of each group of levers being selected for this purpose, as will be perceived from Fig. 3 in which a link 55 is shown extended to a lever extension 59.

It will be perceived that when the lever 47 is in a forwardly swung position, as shown in Fig. 3, the harrow teeth 21 will be in raised or inoperative position, and that when the lever 47 is in the rearwardly sloping position shown in Fig. 4 the harrow teeth 21 will be in operative or ground engaging positions; therefore, by controlling the position of the lever 47 through means operative from the seat of a tractor employed to pull the harrow, the positions of the harrow teeth 21 may likewise be controlled.

In my invention the motive power from a tractor is applied to the harrow in such a manner that pressure will be exerted to move the lever 47 either forwardly or backwardly, depending upon the direction of movement of the tractor.

By means of a clevis 60, Fig. 4, a shaft bar 61 is secured to the tractive vehicle. The draft bar 61, as best shown in Fig. 1, includes a pair of side plates 62 which extend across the sides of the primary lever 42 so that a pole 64 may be extended through a slot or groove 65 extending longitudinally with respect to the primary lever 42. In this manner the draft bar 61 is connected to the primary lever 42 so that the force exerted through the draft bar 61 from the tractive vehicle will be applied so that there will be a tendency to swing the primary lever 42 forwardly or rearwardly in accordance with the forward movement of the tractive vehicle, this tendency being transmitted through the primary link 45 to the intermediate lever member 17.

The rearward end 66 of the draft bar 61 is supported by a secondary lever 67 which hinges on a bolt 68 near the rearward end of the sections 40 and 41. A bolt 69 is passed through the rearward ends of the bars 62 and through a slot 70 in the secondary lever 67.

By means of a forked frame 72 a latch lever or bar 73 hinges upon the adjacent portions of the forward shafts 26 supported by the U-shaped frame members 12 and 13. The forward portion of the latch bar 73 is provided with downwardly extending and rearwardly-faced latch teeth 74 and projects through an opening 76, Fig. 2, provided between bracket members 77 and 78 which project downwardly from the central portion of the frame 48 which constitutes the intermediate lever 47. A pin or bolt 79 extending through the lower ends of the bracket members 77 and 78 cooperates with the teeth 74 of the latch bar 73 in preventing forward swinging movement of the intermediate lever 47 and the primary lever 42 which is connected thereto by the primary link 45.

It will be perceived, by reference to Fig. 4, that when a forward pull in the direction of the arrow 80, Fig. 4, is exerted on the draft bar 61, the pulling force will be exerted on the primary lever 42 and will be divided and carried back to the frame 11 through the pull bar structure 38 and the primary link 45. Therefore, whenever the harrow is being pulled by a forward force exerted on the draft bar 61 a force will be exerted on the upper end of the intermediate lever 47, tending to swing the intermediate lever 47 forwardly from the position in which it is being held by the latch bar 73.

From this it will be recognized that as long as a tooth 74 of the latch bar 73 is in engagement with the pin 79, the harrow teeth or operating devices 21 cannot be swung from ground engaging position, as shown in Fig. 4. To enable release of the latch bar so that the intermediate lever 47 may be swung forwardly to accomplish a lifting of the harrow teeth 21, I provide a crank member 83 which hinges on the outer portions of the pins or bolts 79 and is provided with a roller 84 set in a position eccentric with respect to the bolts 79 so that when a rope 85, extended from the lower end 86 of the crank member 83 to a position on the tractor convenient to a hand of the driver, is pulled by such driver the roller 84 will move upwardly and will lift the latch bar 73 from engagement with the pin 79, thus permitting the pull exerted by the tractor through the draft bar 61 to swing the harrow controlling mechanism in forward direction.

When the latch bar 73 is raised by means of the crank 83, as previously described, the intermediate lever 47 will swing from a correspondingly operative position such as that in which it is shown in Fig. 4 to a correspondingly inoperative position such as that in which it is shown in Fig. 3, the distance or arc through which the lever 47 swings being determined by the length of time the latch bar 73 is held out of engagement by the crank 83.

In Fig. 3 I show the intermediate lever 47 swung forward to its full extent, which is determined by a bolt 87 inserted through one of holes 88 formed in the forward end of the latch bar 73. When the intermediate lever 47 is in the position shown in Fig. 3, the harrow teeth 21 will reside in raised or inoperative position, as likewise shown in this figure. When the primary lever 42 swings into the forwardly sloping position in which it is shown in Fig. 3, the bolt 64 ordinarily moves to the upper end of the slot 65, and in such position is adapted to move rearwardly into a pocket or notch 90 formed at the upper end of the slot 65 when the tractor is backed up or moved rearwardly so as to exert power in the rearward direction indicated by the arrow 91 of Fig. 3 for the purpose of swinging the controlling mechanism in rearward direction. Force exerted against the draft bar 61 in the direction of the arrow 91 in Fig. 3 will cause the levers 42 and 47 to swing rearwardly toward the position in which such levers are indicated in Fig. 4.

Due to the extension of the primary links 54 and 55 from the intermediate lever 47 to the respective throw lever extensions 58 and 59, the levers 32 will be swung so as to rotate the shafts 26 and the harrow teeth 21 toward and into operative positions.

The extent of downward projection of the harrow teeth 21 is determined by the point of engagement of the pins 79 with the latch bar 73; therefore, it will be perceived that a driver or operator seated on the tractor may readily set the operating devices of the farm implement at any desired position of operation and may quickly release the controlling mechanism at any time during the forward movement so that the pulling force will instantaneously operate to withdraw the operating devices from operative position. To cause the lifting of the harrow teeth 21 from ground engaging position, such as shown in Fig. 4, does not require stopping of the tractor, but this may be done while the tractor is in motion by pulling on the rope 85 to cause release of the latch mechanism.

When the harrow teeth 21 are in operative position, as shown in Fig. 4, and the levers of the device are in rearwardly sloping positions, the bolt 64 will slide downwardly to the lower end of the slot 65, with the result that a division of the load transmitted through the pole bar 61 will be such that the greater portion of the power or pulling force will be exerted on the pull bar structure 38.

I have herein shown my invention in simple and practical form, but it is recognized that certain parts or elements thereof are representative of other parts, elements, or mechanisms which may be employed in substantially the same manner to accomplish substantially the same results; therefore, it is not intended that the invention shall be limited to the details disclosed herein but shall have the scope of the following claims.

I claim as my invention:

1. A vehicle of the character described, including: a body structure; operation devices carried by said body structure in a manner to move between operative and inoperative positions; a draft bar extending in the direction of movement of said vehicle; primary and secondary lever members pivoted to said body structure so as to swing in a vertical plane; means securing said draft bar to said primary and secondary lever members; mechanism operative between said primary lever member and said operation devices to move said operation devices into inoperative position when said primary lever member is swung forwardly and into operative position when said primary lever member is swung rearwardly; and a latch for preventing movement of said operation devices from operative to inoperative position.

2. A vehicle of the character described, including: a body structure; operation devices carried by said body structure in a manner to move between operative and inoperative positions; a draft bar extending in the direction of movement of said vehicle; primary and secondary lever members pivoted to said body structure so as to swing in a vertical plane; means securing said draft bar to said primary and secondary lever members; mechanism operative between said primary lever member and said operation devices to move said operation devices into inoperative position when said primary lever member is swung forwardly and into operative position when said primary lever member is swung rearwardly; a latch for preventing movement of said operation devices from operative to inoperative position; and a releaser for said latch operative from a position remote from said vehicle.

3. A vehicle of the character described, including: a body structure; operation devices carried by said body structure in a manner to move between operative and inoperative positions; a draft bar extending in the direction of movement of said vehicle; a primary and secondary lever members pivoted to said body structure so as to swing in a vertical plane; means securing said draft bar to said primary and secondary lever members in such manner that said draft bar may move longitudinally with respect to said primary and secondary lever members and thereby have adjustment in a vertical plane; mechanism operative between said primary lever member and said operation devices to move said operation devices into inoperative position when said primary lever member is swung forwardly and into operative position when said primary lever member is swung rearwardly; a latch for preventing movement of said operation devices from operative to inoperative position; and a releaser for said latch operative from a position remote from said vehicle.

4. A vehicle of the character described, including: a body structure; operation devices carried by said body structure in a manner to move between operative and inoperative positions; primary and secondary lever members pivoted to said body structure so as to swing in an upright plane, said lever members having longitudinal grooves therein, a draft bar through which power may be applied to move said vehicle; connecting means on said draft bar engaging said grooves of said lever members; mechanism operative between said primary lever member and said operation devices to move said operation devices into inoperative position when said primary lever member is swung forwardly and into operative position when said primary lever member is swung rearwardly; and a latch for preventing movement of said operation devices from operative to inoperative position.

5. A vehicle of the character described, including: a body structure; operation devices carried by said body structure in a manner to move between operative and inoperative positions; primary and secondary lever members pivoted to said body structure so as to swing in an upright plane, said lever members having longitudinal grooves therein; a draft bar through which power may be applied to move said vehicle; connecting means on said draft bar engaging said grooves of said lever members; mechanism operative between said primary lever member and said operation devices to move said operation devices into inoperative position when said primary lever member is swung forwardly and into operative position when said primary lever member is swung rearwardly; means near the outer end of said primary member operative when said primary lever member is in forward position for preventing movement of said draft bar downwardly on said primary member when power is applied to said draft bar to move it in rearward direction; and a latch for preventing movement of said operation devices from operative to inoperative position.

6. A vehicle of the character described, including: a body structure; operation devices carried by said body structure in a manner to move between operative and inoperative positions; primary and secondary lever members pivoted to said body structure so as to swing in an upright plane, said lever members having longitudinal grooves therein; a draft bar through which power may be applied to move said vehicle; connecting means on said draft bar engaging said grooves of said lever members; mechanism operative between said primary lever member and said operation devices to move said operation devices into inoperative position when said primary lever member is swung forwardly and into operative position when said primary lever member is swung rearwardly; a notch near the outer end of the groove in said primary member operative when said primary lever member is in forward position for preventing movement of said draft bar downwardly on said primary member when power is applied to said draft bar to move it in rearward direction; and a latch for preventing movement of said operation devices from operative to inoperative position.

7. A vehicle of the character described, including: a body structure; operation devices rotatable on said body structure between operative and inoperative positions; a primary lever pivoted to said body structure so as to swing in a vertical plane; an intermediate lever pivoted to said body in proximity to said primary lever; a throw lever connected so as to rotate said operation devices; a latch bar pivoted to said body structure and engaging said intermediate lever so as to prevent forward swinging of said intermediate lever; releasing means for releasing said latch; links connecting between said levers; and means engaging said primary lever for applying force to move said vehicle, such force application tending to swing said primary lever in a direction corresponding to the direction of said force.

8. A vehicle of the character described, including: a body structure; operation devices rotatable on said body structure between operative and inoperative positions; a primary lever pivoted to said body structure so as to swing in a vertical plane, said primary lever having a longitudinal groove therein with a notch at the outer end of said groove; an intermediate lever pivoted to said body in proximity to said primary lever; a throw lever connected so as to rotate said operation devices; a latch bar pivoted to said body structure and engaging said intermediate lever so as to prevent forward swinging of said intermediate lever; releasing means for releasing said latch; links connecting between said levers; and means engaging said groove in said primary lever for applying force to move said vehicle, such force application tending to swing said primary lever in a direction corresponding to the direction of said force.

9. A vehicle of the character described, including: a body structure; operation devices rotatable on said body structure between operative and inoperative positions; a primary lever pivoted to said body structure so as to swing in a vertical plane; an intermediate lever pivoted to said body in proximity to said primary lever; a throw lever connected so as to rotate said operation devices; a latch bar pivoted to said body structure and having downwardly faced teeth engaging said intermediate lever so as to prevent forward swinging of said intermediate lever; releasing means consisting of a cam pivoted to said intermediate lever for releasing said latch; links connecting between said levers; and means engaging said primary lever for applying force to move said vehicle, such force application tending to swing said primary lever in a direction corresponding to the direction of said force.

10. A device of the character described, including: a body structure; operation devices carried by said body structure and adapted for movement between operative and inoperative positions; a lever pivoted to said body structure; a draft member pivoted to said lever, said draft member exerting a force tending to swing said lever, said force being transmitted through said lever to said body structure so as to produce locomotion thereof; means connecting said lever with said operation devices so as to produce movement of said operation devices between operative and inoperative positions in response to movement of said lever, said means holding said operation devices in operative position when said lever is in rearward position; latch means for holding said operation devices in operative position; and a release for said latch means.

11. A device of the character described, including: a body structure; operation devices carried by said body structure and adapted for movement between operative and inoperative positions; a lever pivoted to said body structure so as to swing through an upright plane; a draft member pivoted to said lever, said draft member exerting a force tending to swing said lever, said force being transmitted through said lever to said body structure so as to produce locomotion thereof; means connecting said lever with said operation devices so as to produce movement of said operation devices between operative and inoperative positions in response to movement of said lever, said means holding said operation devices in operative position when said lever is in rearward position; latch means for holding said operation devices in operative position; and a release for said latch means.

12. A device of the character described, including: a body structure; operation devices carried by said body structure and adapted for movement between operative and inoperative positions; a lever pivoted to said body structure; a draft member slidably secured to said lever, said draft member exerting a force tending to swing said lever, said force being transmitted through said lever to said body structure so as to produce locomotion thereof; means connecting said lever with said operation devices so as to produce movement of said operation devices between operative and inoperative positions in response to movement of said lever, said means holding said operation devices in operative position when said lever is in rearward position; latch means for holding said operation devices in operative position; and a release for said latch means.

13. A device of the character described, including: a body structure; operation devices carried by said body structure and adapted for movement between operative and inoperative positions; a lever pivoted to said body structure so as to swing through an upright plane; a draft member slidably secured to said lever, said draft member exerting a force tending to swing said lever, said force being transmitted through said lever to said body structure so as to produce locomotion thereof; means connecting said lever with said operation devices so as to produce movement of said operation devices between operative and inoperative positions in response to movement of said lever, said means holding said operation devices in operative position when said lever is in rearward position; latch means for holding said operation devices in operative position; and a release for said latch means.

14. A device of the character described, including: a body structure; operation devices carried by said body structure and adapted for movement between operative and inoperative positions; a lever pivoted to said body structure, said lever having a longitudinal slot therein; a draft member engaging said slot so as to slide therealong, said draft member exerting a force tending to swing said lever, said force being transmitted through said lever to said body structure so as to produce locomotion thereof; means connecting said lever with said operation devices so as to produce movement of said operation devices between operative and inoperative positions in response to movement of said lever, said means holding said operation devices in operative position when said lever is in rearward position; latch means for holding said operation devices in operative position; and a release for said latch means.

15. A device of the character described, including: a body structure; operation devices carried by said body structure and adapted for movement between operative and inoperative positions; a lever pivoted to said body structure so as to swing through an upright plane, said lever having a longitudinal slot therein; a draft member engaging said slot so as to slide therealong, said draft member exerting a force tending to swing said lever, said force being transmitted through said lever to said body structure so as to produce locomotion thereof; means connecting said lever with said operation devices so as to produce movement of said operation devices between operative and inoperative positions in response to movement of said lever, said means holding said operation devices in operative position when said lever is in rearward position; latch means for holding said operation devices in operative position; and a release for said latch means.

16. A device of the character described, including: a body structure; operation devices carried by said body structure and adapted for movement between operative and inoperative positions; a lever pivoted to said body structure; a draft member pivoted to said lever, said draft member selectively exerting forces tending to swing said lever forwardly and rearwardly, said forces being transmitted through said lever to said body structure so as to produce locomotion thereof; means connecting said lever with said operation devices so as to produce movement of said operation devices between operative and inoperative positions in response to movement of said lever; latch means for preventing a forward swinging movement of said lever; and a release for said latch means.

17. A device of the character described, including: a body structure; operation devices carried by said body structure and adapted for movement between operative and inoperative positions; a lever pivoted to said body structure so as to swing through an upright plane; a draft member pivoted to said lever, said draft member selectively exerting forces tending to swing said lever forwardly and rearwardly, said forces being transmitted through said lever to said body structure so as to produce locomotion thereof; means connecting said lever with said operation devices so as to produce movement of said operation devices between operative and inoperative positions in response to movement of said lever; latch means for preventing a forward swinging movement of said lever; and a release for said latch means.

In testimony whereof, I have hereunto set my hand at Los Angeles, California, this 17th day of July, 1929.

SAMUEL S. FURRER.